US011592997B2

(12) United States Patent
Soryal et al.

(10) Patent No.: US 11,592,997 B2
(45) Date of Patent: Feb. 28, 2023

(54) SYSTEMS, METHODS AND COMPUTER READABLE MEDIA FOR SOFTWARE DEFINED STORAGE SECURITY PROTECTION

(71) Applicant: AT&T Intellectual Property I, L.P., Atlanta, GA (US)

(72) Inventors: Joseph Soryal, Ridgewood, NY (US); Naila Jaoude, Eatontown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 480 days.

(21) Appl. No.: 16/777,187

(22) Filed: Jan. 30, 2020

(65) Prior Publication Data

US 2021/0240362 A1 Aug. 5, 2021

(51) Int. Cl.
*G06F 3/06* (2006.01)
*G06F 21/31* (2013.01)

(52) U.S. Cl.
CPC .......... *G06F 3/0622* (2013.01); *G06F 3/0653* (2013.01); *G06F 3/0673* (2013.01); *G06F 21/31* (2013.01)

(58) Field of Classification Search
CPC .... G06F 3/0622; G06F 3/0653; G06F 3/0673; G06F 21/31
See application file for complete search history.

(56) References Cited

U.S. PATENT DOCUMENTS

2017/0364437 A1* 12/2017 Emma ................. G06F 12/0223
2018/0068423 A1* 3/2018 Adachi ..................... G06T 7/11
2021/0019067 A1* 1/2021 Miller ................... G06F 3/0641

FOREIGN PATENT DOCUMENTS

AU 2015243877 B2 * 10/2019 ............... G06F 3/06

* cited by examiner

*Primary Examiner* — Matthew Smithers
*Assistant Examiner* — Shu Chun Gao
(74) *Attorney, Agent, or Firm* — Guntin & Gust, PLC; Douglas Schnabel

(57) ABSTRACT

A system is provided with a software controller; a storage platform capable of storing stored blocks of data and having a central processing unit; a controller monitoring and isolation tool embedded in the software controller; and a storage monitoring and isolation tool embedded in the storage platform that is capable of locking down a memory partition on the storage platform. The system also includes a memory for storing computer instructions and a host computer coupled with the memory, wherein the host computer, responsive to executing the computer instructions, performs certain operations. The operations include extracting orchestration configurations through the controller monitoring and isolation tool and relaying the orchestration configurations to the storage monitoring and isolation tool. The operations include correlating using the controller monitoring and isolation tool and the storage monitoring and isolation tool actual locations for incoming data for a customer, and monitoring performance of the storage platform with the storage monitoring and isolation tool. The operations also include tying the stored blocks of data to a physical memory on which the stored blocks of data reside; and providing a passcode to the customer though the controller monitoring and isolation tool that has to be presented to the controller monitoring and isolation tool and the storage monitoring and isolation tool to store data.

20 Claims, 2 Drawing Sheets

SYSTEMS, METHODS AND COMPUTER READABLE MEDIA FOR SOFTWARE DEFINED STORAGE SECURITY PROTECTION

TECHNICAL FIELD

The present disclosure relates to software defined storage. More particularly, the disclosure relates to a method, system, and computer program for providing software defined storage security protection.

BACKGROUND

In Cloud computing a network of remote servers hosted on the Internet are used to store, manage, and process data. A cloud computing architecture provides the ability to run applications and deliver services based on these applications. Customers are apportioned parts of the cloud computing infrastructure on an as-needed basis. This results in a lower cost than if each customer built and operated separate data centers with similar capabilities. In cloud computing virtualization is used to run a virtual instance of a computer system in a layer abstracted from the actual hardware.

Cloud infrastructure demands more flexible storage architectures. One flexible storage architecture is software defined-storage (SDS). SDS provides the ability for a plurality of storage hardware elements to be managed using software, providing a common interface to manage and protect storage assets across vendor platforms. In SDS a storage controller such as a storage area network (SAN) controller manages logical storage volumes utilized by virtual machines, for example, to store virtual disk images used by the virtual machines. SDS systems may be implemented principally in software running on a storage controller to manage access to arrays of commodity storage devices in some applications, while in other applications SDS systems may employ storage devices with additional virtualization functionality. To effectively manage storage, SDS solutions need to provide automation and orchestration.

Automation relates to the concept of storage automatically adjusting to network conditions. For example, a data set that is seeing an increase in read and/or write activity may be allocated more flash storage by an SDS solution. In other words, the storage system automatically adjusts to the needs of the data being hosted without intervention by the network operator.

Orchestration relates to scheduling and integration of automated tasks between complex distributed systems and services. Orchestration provisions, manages and optimally allocates resources based on the unique requirements of an application. For example, storage performance and protection settings may be adjusted by conditions occurring in a OpenStack or vSphere environment. Orchestration may include deploying an application, and connecting it to the network so it can communicate with users and other apps.

SDS is vulnerable to malicious manipulation through some techniques. An example of malicious manipulation is volume swelling. In volume swelling, a virus embedded in the contents or as a residue in the memory from previous data storing multiplies the data when executed to occupy space in the memory and deny the service for legitimate users. Another example of malicious manipulation is unauthorized location changing. In unauthorized location changing, malicious code, when executed, copies the files to other locations in the memory to slow down the invoking/retrieving process of the data. The execution of the malicious piece of the file entails making some of the stored data reach out to the CPU to be executed and implement the malicious task. Thus, there is a need to secure sSDS from stealthy denial of service attacks.

SUMMARY

One general aspect includes a method including the step of extracting orchestration configurations through a controller monitoring and isolation tool embedded in a software controller. Thereafter relaying the orchestration configurations to a storage monitoring and isolation tool embedded in a storage platform that is capable of storing stored blocks of data and wherein the storage platform comprises a central processing unit. The storage monitoring and isolation tool is provided with the capability of locking down a memory partition on the storage platform. The controller monitoring and isolation tool and the storage monitoring and isolation tool correlate actual locations for incoming data for a customer. The method also includes monitoring performance of the storage platform with the storage monitoring and isolation tool and tying the stored blocks of data to a physical memory on which the stored blocks of data reside. The method further includes providing a passcode to the customer through the controller monitoring and isolation tool that has to be presented to the controller monitoring and isolation tool and the storage monitoring and isolation tool to store data.

Implementations may include one or more of the following features. The method where the controller monitoring and isolation tool and the storage monitoring and isolation tool are connected. The method where the orchestration configurations are relayed separately to the storage monitoring and isolation tool. The method where the step of monitoring performance of the storage platform includes monitoring data multiplication. The method where the step of monitoring performance of the storage platform includes monitoring interactions between the stored blocks of data and the central processing unit. The method where locking down a memory partition includes a physical lock down when memory cards are used. The method where locking down a memory partition includes a logical lock down.

One general aspect includes a system including: a software controller; a storage platform capable of storing stored blocks of data and having a central processing unit; a controller monitoring and isolation tool embedded in the software controller; and a storage monitoring and isolation tool embedded in the storage platform that is capable of locking down a memory partition on the storage platform. The system includes a memory for storing computer instructions; a host computer coupled with the memory, where the host computer, responsive to executing the computer instructions, performs operations including extracting orchestration configurations through the controller monitoring and isolation tool and relaying the orchestration configurations to the storage monitoring and isolation tool. the operations further include correlating using the controller monitoring and isolation tool and the storage monitoring and isolation tool actual locations for incoming data for a customer. The operations also include monitoring performance of the storage platform with the storage monitoring and isolation tool. The operations further include tying the stored blocks of data to a physical memory on which the stored blocks of data reside and providing a passcode to the customer though the controller monitoring and isolation tool that has to be presented to the controller monitoring and isolation tool and the storage monitoring and isolation tool to store data.

Implementations may include one or more of the following features. The system where the controller monitoring and isolation tool and the storage monitoring and isolation tool are connected. The system where the orchestration configurations are relayed separately to the storage monitoring and isolation tool. The system where the operations of the host computer of including monitoring performance of the storage platform includes monitoring data multiplication. The system where the operations of the host computer of including monitoring performance of the storage platform includes monitoring interactions between the stored blocks of data and the central processing unit. The system where locking down a memory partition includes a physical lock down when memory cards are used. The system where locking down a memory partition includes locking down the memory partition using a logical lock down.

One general aspect includes a non-transitory, tangible computer-readable medium having computer-executable instructions stored thereon which, when executed by a computer, cause the computer to perform a method including: extracting orchestration configurations through a controller monitoring and isolation tool embedded in a software controller and relaying the orchestration configurations to a storage monitoring and isolation tool embedded in a storage platform that is capable of storing stored block of data and having a central processing unit, and where the storage monitoring and isolation tool is capable of locking down a memory partition on the storage platform. The method performed by the computer also includes correlating using the controller monitoring and isolation tool and the storage monitoring and isolation tool actual locations for incoming data for a customer. The method performed by the computer also includes monitoring performance of the storage platform with the storage monitoring and isolation tool and tying the stored blocks of data to a physical memory on which the stored blocks of data reside. The method includes providing a passcode to the customer though the controller monitoring and isolation tool that has to be presented to the controller monitoring and isolation tool and the storage monitoring and isolation tool to store data.

Implementations may include one or more of the following features. The non-transitory, tangible, computer-readable medium further including instructions which, when executed by the computer, cause the computer to perform the method further including connecting the controller monitoring and isolation tool and the storage monitoring and isolation tool. The non-transitory, tangible, computer-readable medium where relaying the orchestration configurations includes relaying the orchestration configurations separately to the storage monitoring and isolation tool. The non-transitory, tangible, computer-readable medium where monitoring performance of the storage platform includes monitoring data multiplication. The non-transitory, tangible, computer-readable medium monitoring performance of the storage platform includes monitoring interactions between the stored blocks of data and the central processing unit. The non-transitory, tangible, computer-readable medium where locking down a memory partition includes implementing a logical lock down using the storage monitoring and isolation tool.

DETAILED DESCRIPTION OF ILLUSTRATIVE EMBODIMENTS

Glossary

"Memory partitioning" is a system where the memory of a computer system is divided into sections for use by the resident programs. These divisions are known as memory partitions. There are different ways in which memory can be partitioned: fixed, variable, and dynamic partitioning.

"Block storage" organizes data into blocks and stores the blocks as separate pieces. A unique identifier is provided to each block of data, allowing a storage system to place the smaller pieces of data wherever is most convenient. Block storage is often configured to decouple the data from the user's environment and spread it across multiple environments that can better serve the data. It is usually deployed in storage-area network (SAN) environments and must be tied to a functioning server.

GUID Partition Table (GPT) is a standard for the layout of partition tables of a physical computer storage device (e.g. hard disk drive), using globally unique identifiers (GUIDs).

Network monitoring refers to the oversight of a computer network using specialized management software tools. Network monitoring allows administrators to monitor access, routers, slow or failing components, firewalls, core switches, client systems, and server performance—among other network data. A network monitoring system is capable of detecting and reporting failures of devices or connections. It normally measures the CPU utilization of hosts, the network bandwidth utilization of links, and other aspects of the operation. It often sends messages—sometimes called watchdog messages—over the network to each host to verify it is responsive to requests. When failures, unacceptably slow response or other unexpected behavior is detected, these systems send additional messages called alerts to designated locations such as a management server, an email address, or a phone number to notify system administrators.

"SNMP" (Simple Network Management Protocol) is a management protocol that includes network monitoring software. It includes: The devices in the network that is being monitored; agent software on the monitored devices; a network management system, which is a toolset on a server that monitors each device on a network and communicates information about those devices to an IT administrator. Administrators can use SNMP monitor and manage aspects of their networks by: gathering information on how much bandwidth is being used on the network; Active polling the network devices to ask for a status at specified intervals; notifying the admin by text message of a device failure; collecting error reports, which can be used for troubleshooting; Emailing an alert when the server reaches a specified low disk space level.

"Isolation," in database systems, determines how transaction integrity is visible to other users and systems. Isolation is typically defined at database level as a property that defines how/when the changes made by one operation become visible to other.

Figure 1:
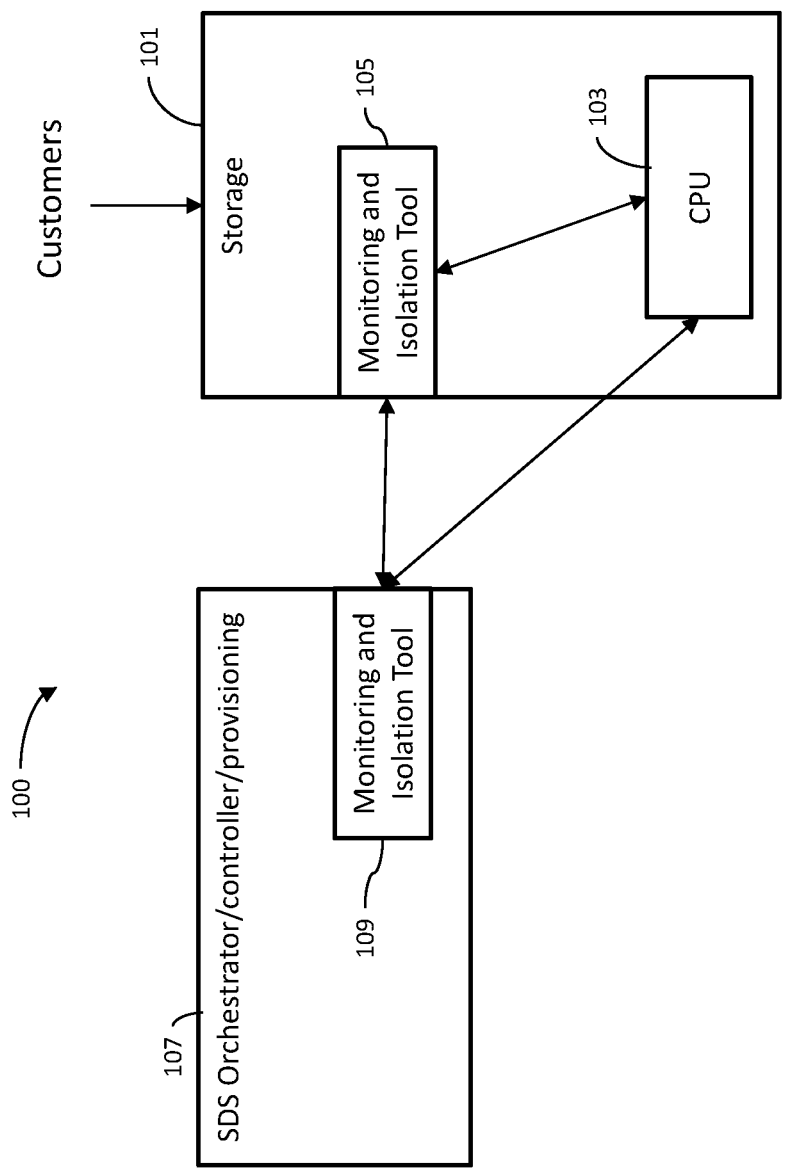
FIG. 1 is a block diagram of a system for providing software defined storage security protection.

Illustrated in FIG. 1 is a system 100 for providing software defined storage security protection. The system 100 includes a storage platform 101 having a central processing unit (CPU) 103 and an embedded storage monitoring and isolation tool 105. The storage monitoring and isolation tool 105 monitors proper allocation of the incoming data for the customers. The storage monitoring and isolation tool 105 may also monitor swelling (data multiplication without actual incoming data) as well as the interactions between stored blocks of data and CPU 103. The storage monitoring and isolation tool 105 is provided with the capability of physically or logically locking down a memory partition thereby tying every data block of stored data to the physical memory it resides in through the use of the GUID Partition Table. The storage monitoring and isolation tool 105 performs periodic checks of volume and locations. The periodic checks may be conducted in other than real time, for example by reviewing the logs of components. The system 100 also include a controller 107 which provides orchestration, control and provisioning functionality. A controller monitoring and isolation tool 109 is embedded in the controller 107. The controller monitoring and isolation tool 109 and the storage monitoring and isolation tool 105 are connected and communicate via secure channel with special credentials specific for that communication, preferably a different channel that the one between the controller 107 (Orchestrator) and the storage platform 101 to spin up the virtual machine. The controller monitoring and isolation tool 109 extracts the orchestration configurations and relays them separately to the storage monitoring and isolation tool 105. To add an extra layer of security the controller monitoring and isolation tool 109 gives every provisioned user/customer a passcode that is required to be presented to the storage monitoring and isolation tool 105 before any data can be stored.

Figure 2:
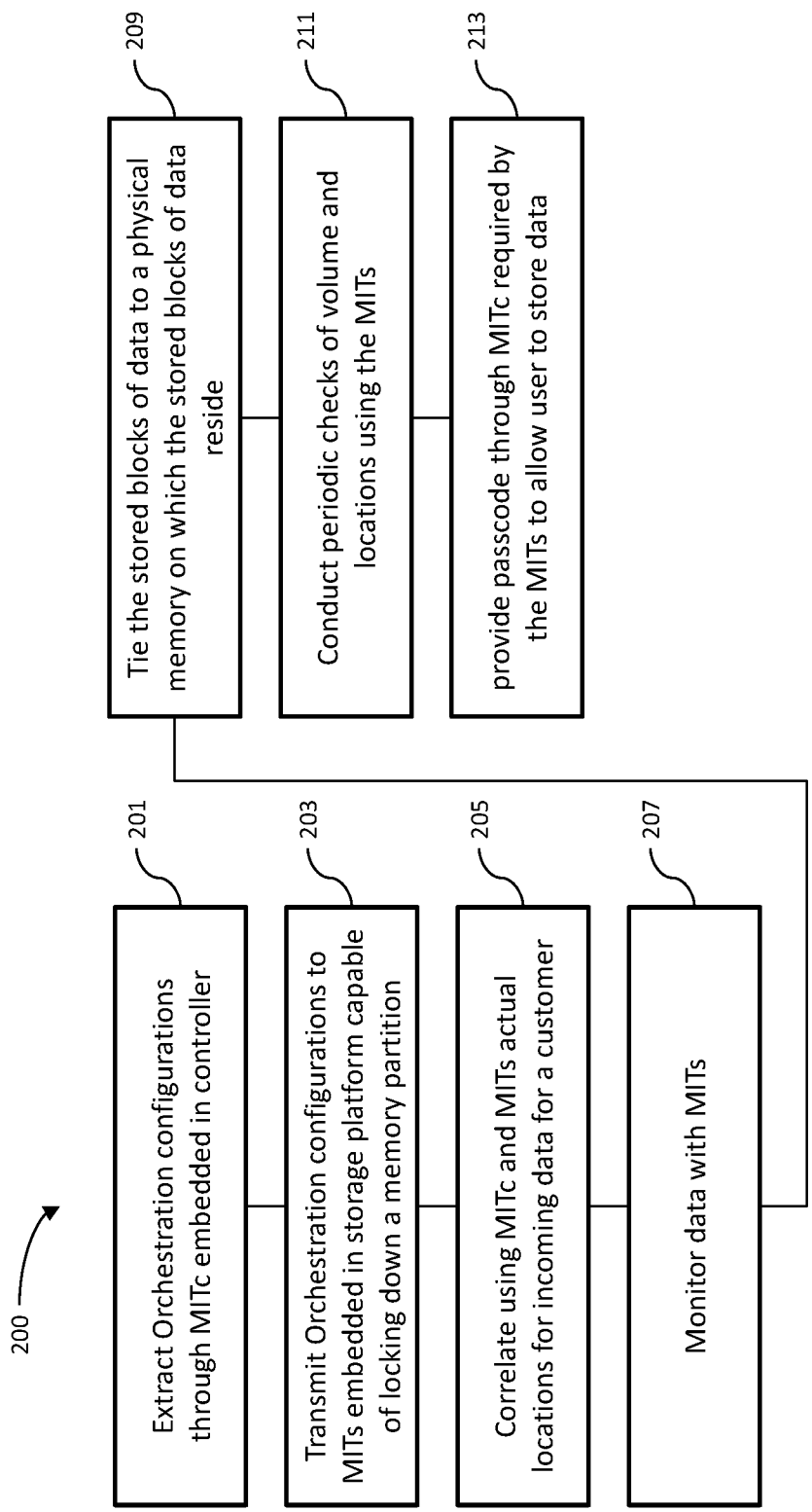
FIG. 2 is a flowchart of a method for providing software defined storage security protection.

Illustrated in FIG. 2 is a flowchart for a method 200 for providing software defined storage security protection. Before logging into the storage platform a user has to be authorized by a security module in the controller (Orchestrator) 107. When the security modules spin up the security module in the storage platform 101, it embeds several credential sets and these are distributed to future users.

In step 201, the method 200 extracts orchestration configurations through controller monitoring and isolation tool 109 (MITc) embedded in controller 107.

In step 203, the method 200 transmits orchestration configurations to a storage monitoring and isolation tool 105 (MITs) embedded in a storage platform 101. The MITs is capable of locking down a memory partition.

In step 205, the method 200 correlates the actual locations for incoming data using the MITs and the MITc.

In step 207, the method 200 monitors the data using the MITs. For example, the MITs may monitor the data to identify swelling (data multiplication without actual incoming data). The MITs may also monitor the interactions between the stored blocks of data and the central processing unit 103 in the storage platform 101.

In step 209, the method 200 ties the stored blocks of data to the physical memory on which the stored blocks of data reside.

In step 211, the method 200 instructs the MITs to conduct periodic volume and location checks. The checks do not have to be real-time so as to not slow down the system. The checks may be conducted after he fact by reviewing the components' logs.

In step 213, the method 200 instructs the MITc to provide a passcode that is required by the MITs to enable a provisioned user/customer to actually store the data.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method comprising:

spinning up, by a software-defined controller including a processor, a storage platform via a first communication channel between the software-defined controller and the storage platform;

extracting, by the software-defined controller, orchestration configurations by a controller monitoring and isolation tool embedded in the software-defined controller;

relaying, by the software-defined controller, the orchestration configurations to a storage monitoring and isolation tool embedded in the storage platform, wherein the relaying is via a second communication channel between the controller monitoring and isolation tool and the storage monitoring and isolation tool, wherein the second communication channel is separate from the first communication channel, wherein the storage platform is capable of storing stored blocks of data and having a central processing unit, and wherein the storage monitoring and isolation tool is capable of locking down a memory partition on the storage platform;

correlating, by the software-defined controller, actual locations for incoming data for a user by the controller monitoring and isolation tool and the storage monitoring and isolation tool, wherein performance of the storage platform is monitored by the storage monitoring and isolation tool, and wherein the stored blocks of data are tied to a physical memory on which the stored blocks of data reside by the storage monitoring and isolation tool; and providing, by the software-defined controller, a passcode to the user through the controller monitoring and isolation tool that has to be presented to the controller monitoring and isolation tool and the storage monitoring and isolation tool to store data.

2. The method of claim 1 wherein the second communication channel between the controller monitoring and isolation tool and the storage monitoring and isolation tool requires second credentials different from the passcode.

3. The method of claim 1 wherein the orchestration configurations are relayed separately to the storage monitoring and isolation tool.

4. The method of claim 1 wherein the step of monitoring performance of the storage platform comprises monitoring data multiplication.

5. The method of claim 1 wherein the step of monitoring performance of the storage platform comprises monitoring interactions between the stored blocks of data and the central processing unit.

6. The method of claim 1 wherein locking down a memory partition comprises a physical lock down when memory cards are used.

7. The method of claim 1 wherein locking down a memory partition comprises a logical lock down.

8. A system comprising:
a software controller;
a storage platform capable of storing stored blocks of data and having a central processing unit;
a controller monitoring and isolation tool embedded in the software controller;
a storage monitoring and isolation tool embedded in the storage platform that is capable of locking down a memory partition on the storage platform;
a memory for storing computer instructions;
a host computer coupled with the memory, wherein the host computer, responsive to executing the computer instructions, performs operations comprising:
spinning up the storage platform via a first communication channel between the software controller and the storage platform;
extracting orchestration configurations through the controller monitoring and isolation tool;
relaying the orchestration configurations to the storage monitoring and isolation tool via a second communication channel between the controller monitoring and isolation tool and the storage monitoring and isolation tool, and wherein the second communication channel is separate from the first communication channel;
correlating using the controller monitoring and isolation tool and the storage monitoring and isolation tool actual locations for incoming data for a user;
monitoring performance of the storage platform with the storage monitoring and isolation tool;
tying the stored blocks of data to a physical memory on which the stored blocks of data reside; and
providing a passcode to the user though the controller monitoring and isolation tool that has to be presented to the controller monitoring and isolation tool and the storage monitoring and isolation tool to store data.

9. The system of claim 8 wherein the second communication channel between the controller monitoring and isolation tool and the storage monitoring and isolation tool requires second credentials different from the passcode.

10. The system of claim 8 wherein the orchestration configurations are relayed separately to the storage monitoring and isolation tool.

11. The system of claim 8 wherein the operations of the host computer of comprising monitoring performance of the storage platform comprises monitoring data multiplication.

12. The system of claim 8 wherein the operations of the host computer of comprising monitoring performance of the storage platform comprises monitoring interactions between the stored blocks of data and the central processing unit.

13. The system of claim 12 wherein locking down a memory partition comprises a physical lock down when memory cards are used.

14. The system of claim 12 wherein locking down a memory partition comprises locking down the memory partition using a logical lock down.

15. A non-transitory, tangible computer-readable medium having computer-executable instructions stored thereon which, when executed by a computer, cause the computer to perform a method comprising:
spinning up, by a software controller, a storage platform via a first communication channel between the software controller and the storage platform;
extracting orchestration configurations through a controller monitoring and isolation tool embedded in the software controller;
relaying the orchestration configurations to a storage monitoring and isolation tool embedded in the storage platform that is capable of storing stored block of data and having a central processing unit, wherein the storage monitoring and isolation tool is capable of locking down a memory partition on the storage platform, wherein the relaying the orchestration configurations is via a second communication channel between the controller monitoring and isolation tool and the storage monitoring and isolation tool, and wherein the second communication channel is separate from the first communication channel;
correlating using the controller monitoring and isolation tool and the storage monitoring and isolation tool actual locations for incoming data for a user;
monitoring performance of the storage platform with the storage monitoring and isolation tool;
tying the stored blocks of data to a physical memory on which the stored blocks of data reside; and
providing a passcode to the user though the controller monitoring and isolation tool that has to be presented to the controller monitoring and isolation tool and the storage monitoring and isolation tool to store data.

16. The non-transitory, tangible, computer-readable medium of claim 15 further comprising instructions which, when executed by the computer, cause the computer to perform the method further comprising connecting the controller monitoring and isolation tool and the storage monitoring and isolation tool.

17. The non-transitory, tangible, computer-readable medium of claim 15 wherein relaying the second communication channel between the software monitoring and storage tool and the storage monitoring and isolation tool requires second credentials different from the passcode.

18. The non-transitory, tangible, computer-readable medium of claim 15 wherein monitoring performance of the storage platform comprises monitoring data multiplication.

19. The non-transitory, tangible, computer-readable medium of claim 15 monitoring performance of the storage platform comprises monitoring interactions between the stored blocks of data and the central processing unit.

20. The non-transitory, tangible, computer-readable medium of claim 19 wherein locking down a memory partition comprises implementing a logical lock down using the storage monitoring and isolation tool.

\* \* \* \* \*